United States Patent
Schultze

(10) Patent No.: US 8,126,019 B2
(45) Date of Patent: Feb. 28, 2012

(54) METHOD FOR TIME SYNCHRONIZATION IN A CYCLICALLY OPERATING COMMUNICATION SYSTEM

(75) Inventor: Stephan Schultze, Lohr am Main (DE)

(73) Assignee: Bosch Rexroth AG, Stuttgart (DE)

( * ) Notice: Subject to any disclaimer, the term of this patent is extended or adjusted under 35 U.S.C. 154(b) by 1598 days.

(21) Appl. No.: 11/280,541

(22) Filed: Nov. 15, 2005

(65) Prior Publication Data

US 2006/0153245 A1 Jul. 13, 2006

(30) Foreign Application Priority Data

Nov. 15, 2004 (DE) .......................... 10 2004 055 105

(51) Int. Cl.
*H04J 3/06* (2006.01)
(52) U.S. Cl. ........................................ 370/503; 370/252
(58) Field of Classification Search .................. 370/503, 370/516, 509
See application file for complete search history.

(56) References Cited

U.S. PATENT DOCUMENTS

| | | | |
|---|---|---|---|
| 7,397,823 B2 * | 7/2008 | Engel | 370/503 |
| 2002/0172226 A1 * | 11/2002 | Staats | 370/503 |
| 2003/0058893 A1 | 3/2003 | Dworkin et al. | |
| 2004/0141526 A1 * | 7/2004 | Balasubramanian et al. | 370/503 |
| 2005/0207387 A1 * | 9/2005 | Middleton et al. | 370/347 |

FOREIGN PATENT DOCUMENTS

| | | |
|---|---|---|
| DE | 102 44 978 | 4/2004 |
| EP | 1 168 694 | 1/2002 |

OTHER PUBLICATIONS

German Office Action dated Sep. 30, 2005 issued in corresponding German Application No. 10 2004 055 105.7-42.

* cited by examiner

*Primary Examiner* — Ricky Ngo
*Assistant Examiner* — David Oveissi
(74) *Attorney, Agent, or Firm* — Kenyon & Kenyon LLP

(57) ABSTRACT

In a method for time synchronization of subscribers connected via a cyclically operating communication system, an item of time information is transmitted to the subscribers to be synchronized. It is provided to transmit an item of absolute time information simultaneously to all subscribers to be synchronized, for initialization, and to implement a synchronization by recalculating the local times of the subscribes at least following one or a plurality of cycles having a known cycle time. The item of absolute time information and the known cycle times are used for the recalculation.

18 Claims, 3 Drawing Sheets

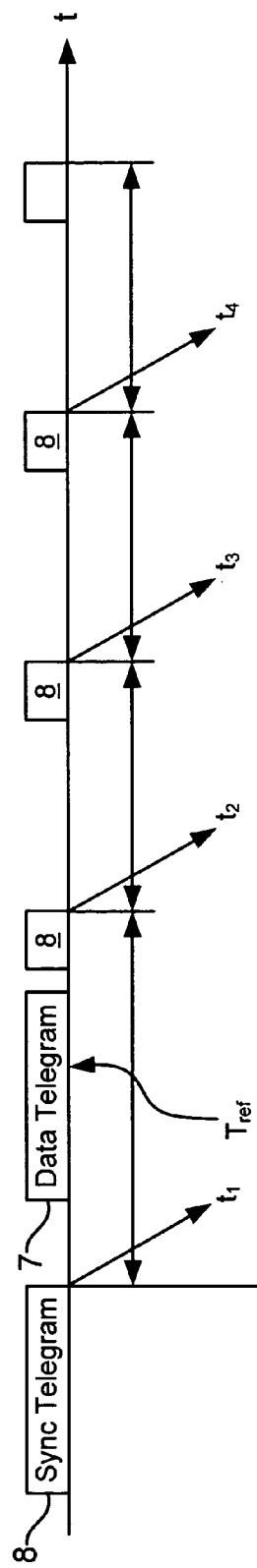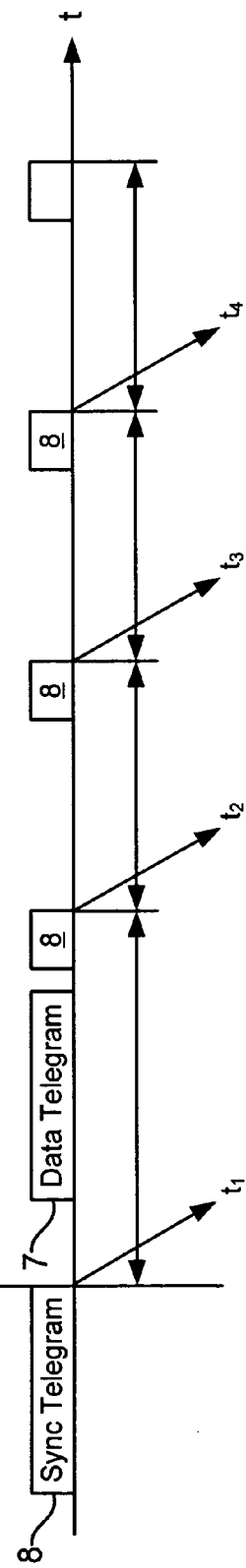

METHOD FOR TIME SYNCHRONIZATION IN A CYCLICALLY OPERATING COMMUNICATION SYSTEM

FIELD OF THE INVENTION

The present invention relates to a method for time synchronization of subscribers connected via a cyclically operating communication system, an item of time information being transmitted to the subscribers to be synchronized. The present invention also relates to subscribers of such a communication system and to the communication system itself.

BACKGROUND INFORMATION

A highly precise time synchronization of subscribers in communication systems is considered the basis of many future real-time applications in the field of automation and measuring technology. Precise time information in data terminals (subscribers) allows the realization of distributed, highly synchronous processes such as they are increasingly demanded in motion control applications, in measuring and control technology or in mechanical engineering. Time synchronization is thus a prerequisite for virtually all real-time applications in communication systems.

The IEEE1588 standard is often used for cyclical time synchronization. It bears the title "Precision Clock Synchronization Protocol for Networked Measurement and Control Systems", abbreviated to "PTP" for "Precision Time Protocol". This standard defines a method for synchronizing many spatially distributed real-time clocks that are interconnected via a package-compatible network such as the Ethernet. According to PTP, one subscriber establishes itself as master clock and transmits a first software-generated sync-telegram and then a follow-up telegram to the other subscribers (slaves) indicating the precise time of the first telegram. On the basis of the first telegram and the follow-up telegram as well as its own clock, the receiver-subscriber is able to calculate the time difference between its own clock and the master clock and thus carry out a synchronization. This synchronization process repeats itself in the sync-telegram cycle.

Another known method is the cyclical transmission of an item of absolute time information (such as SYNAX network) for time synchronization at a slight time delay in the transmission.

The current solutions, some of which use complicated mechanisms, cyclically synchronize the time information in the subscribers by active transmission of an item of absolute time information. The present invention provides a simplified time-synchronization method in cyclically operating communication systems.

SUMMARY OF THE INVENTION

In the synchronization method according to the present invention, an item of absolute time information for initialization is simultaneously transmitted to all subscribers of the communication system to be synchronized; after at least one cycle (or following a plurality of cycles) having a known cycle time, a synchronization takes place by recalculation of the local time of each subscriber to be synchronized on the basis of the known absolute time information and the individual cycle times. As a result, the absolute time information is transmitted only once for initialization, and the time subsequently carried along in a decentralized and drift-free manner. The absolute time information must be transmitted once to all stations (subscribers) simultaneously. The time then runs in all stations in a synchronous manner through decentralized mechanisms without the need for renewed transmission. These mechanisms are limited to simple computational operations. It is useful to recalculate the local time on the basis of the transmitted item of absolute time (absolute time information) after each cycle by adding the known cycle time to the absolute time (first step) or to the most recently calculated time (n-th step).

In another development, the calculation may be carried out in such a way that each recalculation is based on the absolute time to which the known cycle times of the cycles having occurred so far—i.e., having been added since the initialization—are added.

It must be noted that the present invention may also be used for variable cycle times, provided the cycle times themselves are known in the subscribers.

One should be aware that the terms "absolute time information" and "local time" need not necessarily denote classic chronological time. The terms denote any conceivable form of time information, be it a date, a time of day, or a consecutive enumeration (incremented or decremented series of numbers), for instance the addition of the cycles (cycle number). Absolute time information within the framework of the present invention thus denotes initializing time information of the type mentioned, which is used as basis for the further time count or time calculation. For initializing the time synchronization, this absolute time information is simultaneously transmitted to all subscribers to be synchronized, it being assumed within the framework of the present application that transmission links with no or only negligible propagation times for the communication quality are available, so that one may be sufficiently accurate when mentioning also a simultaneous receipt of the absolute time information in the subscribers.

It is useful if one of the subscribers of the communication system assumes the role of time reference master which transmits the absolute time information to the other subscribers. However, there are also other communication systems (NTP, GPS) where a plurality of clock-pulse generators synchronize among themselves and act as time-reference master. In particular in automation engineering, scenarios are also conceivable in which a controller establishes itself as time reference master to which other controllers synchronize, while yet other elements depending on one of these controllers then sub-synchronize themselves with respect to the controller they have been assigned.

For practical purposes, the absolute time information is transmitted as global telegram in the form of a broadcast that reaches all subscribers. Communication systems in automation engineering usually operate using a communication master who announces which time it is going to be at which point, so that the other subscribers are able to set their local time to the specific time upon arrival of a corresponding signal. According to the present invention, these subscribers may afterwards reset their local times according to the known cycle times upon the cyclical arrival of the sync telegrams.

The time synchronization according to the present invention requires that a cyclically synchronizing event pass through the system, sync telegrams, for example, being able to be used to this end.

It is also possible to implement the synchronization multiple times during each cycle time in accordance with a signaling interval (cf. fine interpolation).

A subscriber of a cyclically operating communication system, configured according to the present invention, has a computing unit which is designed such for time synchronization that after receipt of an item of absolute time information the local time of a subscriber is recalculated after at least one or a plurality of cycles having a known cycle time. The calculation possibilities were already outlined previously. The processing unit may be a CPU already available in the subscriber.

A computing unit of the subscriber of the cyclically operating communication system having such a design allows the implementation of the afore-described method according to the present invention.

A communication system according to the present invention has the described subscribers as stations to be synchronized in terms of time.

BRIEF DESCRIPTION OF THE DRAWINGS

FIGS. 2A and 2B show a time diagram to illustrate the time synchronization according to the present invention, FIG. 2A showing the output of a subscriber which has established itself as communication master, and FIG. 2B showing the input of a subscriber to be synchronized.

DETAILED DESCRIPTION

Figure 1A:
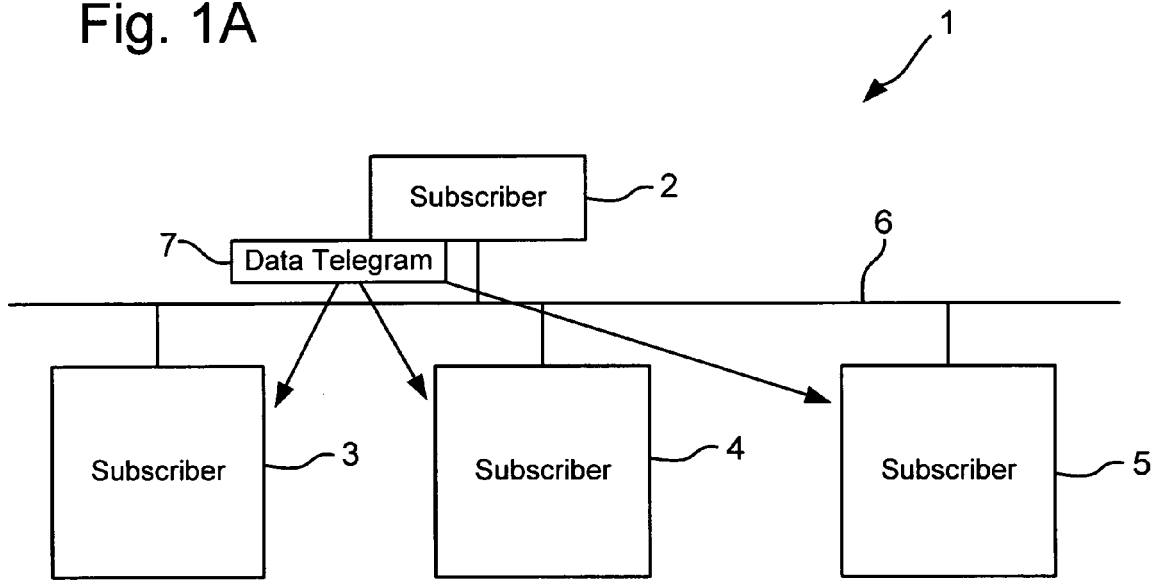
FIGS. 1A and 1B show a cyclically operating communication system in a schematic representation, including the step according to the present invention of initialization of the real-time capable communication (FIG. 1A) and the subsequent synchronization according to the present invention (FIG. 1B).
Figure 1B:
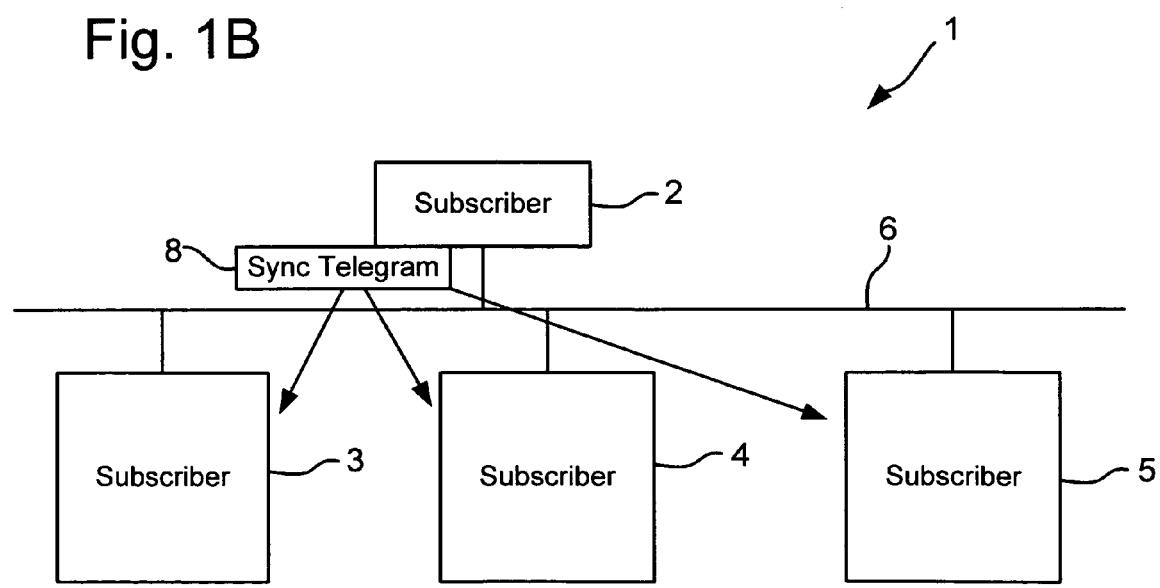

FIGS. 1A and 1B show the principles of a communication system 1 according to the present invention for implementing a communication able to be carried out in real time between subscribers 2, 3, 4, 5 of communication system 1. Subscribers 2, 3, 4 and 5 are interconnected via a physical transmission level. An example of a communication system 1 shown in FIGS. 1A and 1B is the Ethernet or the SERCOS interface. In the exemplary embodiment shown, a subscriber 2 establishes itself as communication master, so that the other subscribers 3, 4, and 5 function as communication slaves. In the example shown, communication master 2 may be a conventional PC, the other subscribers may be controllers, for instance, SPC's (stored-program controls) or sensors or actuators. Typical areas in which shown communication system 1 is used is the field of automation engineering.

FIG. 1A shows the first step of the initialization of the time synchronization according to the present invention in which, first of all, communication master 2 as time reference master simultaneously transmits a data telegram 7 to subscribers 3, 4 and 5 to be synchronized. This data telegram 7 includes absolute time information or, in other words, a time reference having time information. For example, the data diagram (telegram) states the date as well as the precise time down to a millisecond. As explained earlier already, the absolute time information may also simply represent any given number on which the further time count will be based. For example, the time count may represent the counting of the cycles in the communication system.

FIG. 1B schematically illustrates the steps following the initialization in which cycle information is sent to subscribers 3, 4 and 5 to be synchronized by communication master 2.

In cyclically operating communication systems 1, such cycle information is present in the form of sync telegrams 8. The cycle time according to which one such sync telegram 8 is transmitted in each case is known to subscribers 3, 4 and 5 as well. After initialization, it is thus possible to recalculate the local time of each subscriber 3, 4 and 5 by simply adding the cycle time to the transmitted time reference (absolute time information). The clocks of subscribers 3, 4, 5 are then synchronized again.

Typical cycle times are 0.1 to 100 ms, in particular 1 to 10 ms. It should be pointed out that the present invention also allows variable cycle times in the communication system as long as the particular cycle time is known in all stations (subscribers). The item of absolute time information (time reference) is sent simultaneously to subscribers 3, 4, 5 (broadcast). It may be assumed here that no propagation delay occurs or that the propagation delay for the subsequent time synchronization is negligible, so that it may be taken for granted overall that the item of absolute time information reaches subscribers 3, 4, 5 to be synchronized at the same time.

From the schematic representation according to FIGS. 1 (and 2) an advantage of the present invention can be gathered quite clearly, which consists of the fact that compared to the time synchronizations utilized heretofore, there is no need to send an item of absolute time information (data telegram 7) to the other subscribers after each cycle. The reading of such a data telegram may be implemented using hardware or software technology, but it is more involved and time-intensive than the recording of a clock-generator signal (sync telegram 8), so that the present invention allows the time synchronization to be carried out in a decentralized and drift-free manner.

FIG. 2 contrasts two time diagram, FIG. 2A showing the time diagram of the output of communication master 2, and FIG. 2B showing the time diagram of the input of a communication slave, i.e., a subscriber 3, 4, 5 to be synchronized. With regard to the terms, FIG. 2 refers to FIG. 1, identical reference numerals denoting the same elements.

In the example of the time synchronization shown in FIG. 2, the time-reference transmitter—identical to the communication master or synchronization-signal transmitter in this example—transmits a synchronization telegram (sync telegram 8) to all other subscribers of the communication system at specific intervals whose interval corresponds to a fixed cycle time. The corresponding points in time are denoted by $t_1$, $t_2$, $t_3$, $t_4$ and so forth. A data telegram 7, which in this example represents a time reference according to the format "2000-04-01, 16:05:30.123", is transmitted between instants $t_1$ and $t_2$ for initialization. Following this initialization, the time reference transmitter—here, communication master 2 (cf. FIG. 1)—transmits only sync telegrams 8 according to the communication cycles, that is to say, at the mentioned instants $t_1$, $t_2$, $t_3$ and so forth. The cycle time amounts to 10 ms in this exemplary embodiment.

FIG. 2B shows the time diagram of the input of a communication slave, i.e., one of subscribers 3, 4, 5. Between instants $t_1$ and $t_2$, at time $T_{ref}$, the communication slave receives data telegram 7 with time reference "2000-04-01, 16:05:30.123". The computing unit of this subscriber (communication slave) is configured in such a way that the local time of this subscriber is recalculated at the time of the next cycle time $t_2$, after receipt of this item of absolute time information constituting data telegram 7. In this exemplary embodiment, the known cycle time of 10 ms is thus added to the absolute time information in data telegram 7 at instant $t_2$, so that the recalculated local time of the communication slave at instant $t_2$ reads: "2000-04-01, 16:05:30.133".

As is shown in this example, the time synchronization according to the present invention merely requires that initializing data telegram 7 reaches subscribers 3, 4, 5 within the interval of $t_1$ to $t_2$.

The further steps of the time synchronization run in an analogous manner to the already elucidated procedure, so that at instant $t_3$, the local time of the communication slave reads: "2000-04-01, 16:05:30.143", at instant $t_4$: "2000-04-01, 16:05:30.153", and so forth.

In the exemplary embodiment shown in FIGS. 2A and 2B, a synchronization which allows a real-time communication in the communication system shown in FIGS. 1A and 1B, is thus carried out at every cycle time, i.e., every 10 ms. Such a real-time communication is of enormous importance in automation engineering.

Figure 3:
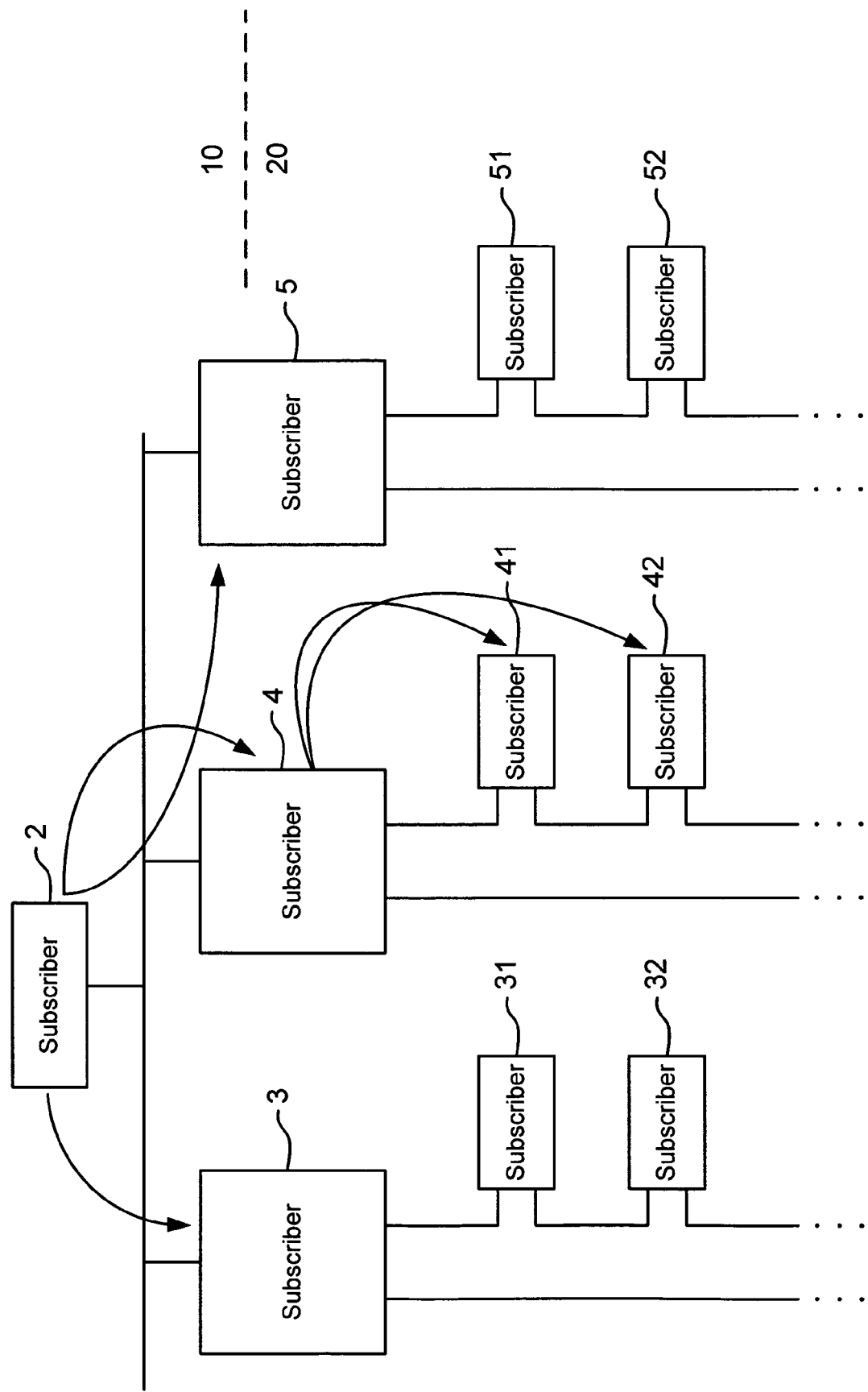
FIG. 3 shows a communication system having a hierarchy.

FIG. 3 shows a communication system having a hierarchy, two hierarchy levels 10 and 20 being shown. Hierarchy level 10 includes the communication, able to be carried out in real time among subscribers 2, 3, 4 and 5; hierarchy level 20 in each case includes subscribers 3, 4 and 5 each with individual subordinate subscribers 31, 32, and 41, 42 as well as 51, 52, respectively. A so-called subsynchronization is carried out among participants 3, 31 and 32, i.e., subscribers 31 and 32 synchronize together with subscriber 3; subscribers 41 and 42 synchronize accordingly with subscriber 4, and subscribers 51 and 52 with subscriber 5. The shown arrows indicate the hierarchy or synchronization levels. Subscribers 3, 4 and 5 may be hardware controllers or stored-program controllers, as already mentioned, while the particular sub-subscribers are sensors and actuators such as drives and the like, which are triggered by the individually superposed control. With regard to subordinate subscribers 31, 32, subscriber 3 functions as communication master, and this applies correspondingly to the other lines of hierarchy level 20.

The method for time synchronization according to the present invention allows a decentralized, rapid and drift-free synchronization of subscribers in cyclically operating communication systems and thus permits a fault-free real-time communication among the subscribers as it is of enormous importance for automation engineering, in particular.

What is claimed is:

1. A method for time synchronization of subscribers connected via a cyclically operating communication system, the method comprising:
   transmitting an item of time information to the subscribers to be synchronized;
   simultaneously transmitting an item of absolute time information for initialization to all of the subscribers to be synchronized;
   carrying out an individual synchronization by recalculating local times of the subscribers from the absolute time information and a cycle time in each case after at least one or a plurality of cycles having a known cycle time; and
   recalculating a local time following each individual cycle, by adding a known cycle time to a most recently calculated time;
   wherein the absolute time information is transmitted by one of the subscribers of the communication system to the other subscribers to be synchronized, and
   wherein, for initialization, the item of absolute time information is transmitted to the subscribers to be synchronized as broadcast, by a global telegram.

2. The method according to claim 1, wherein the local time is recalculated in each case as a number of cycles having occurred up to this point.

3. The method according to claim 1, wherein the local times of the subscribers to be synchronized are recalculated after each arriving sync telegram.

4. The method according to claim 1, wherein the local times of the subscribers are recalculated a plurality of times per cycle.

5. The method according to claim 1, wherein the local time is recalculated in each case as a number of cycles having occurred up to this point.

6. The method according to claim 1, wherein the local times of the subscribers to be synchronized are recalculated after each arriving sync telegram.

7. The method according to claim 1, wherein the local times of the subscribers are recalculated a plurality of times per cycle.

8. A subscriber of a cyclically operating communication system, comprising:
   a computing unit configured for time synchronization so that, after receipt of an item of absolute time information for initialization, a local time of the subscriber is recalculated from the item of absolute time information and a cycle time, at least following at least one cycle having a known cycle time,
   wherein a local time is recalculated following each individual cycle, by adding a known cycle time to a most recently calculated time,
   wherein the absolute time information is transmitted by one of the subscribers of the communication system to the other subscribers to be synchronized, and
   wherein, for initialization, the item of absolute time information is transmitted to the subscribers to be synchronized as broadcast, by a global telegram.

9. The subscriber according to claim 8, wherein the local time is recalculated in each case as a number of cycles having occurred up to this point.

10. The subscriber according to claim 8, wherein the local times of the subscribers to be synchronized are recalculated after each arriving sync telegram.

11. The subscriber according to claim 8, wherein the local times of the subscribers are recalculated a plurality of times per cycle.

12. A cyclically operating communication system, comprising:
   a computing unit; and
   a subscriber, the subscriber including the computing unit;
   wherein the computing unit is configured for time synchronization so that, after receipt of an item of absolute time information for initialization, a local time of the subscriber is recalculated from the item of absolute time information and a cycle time, at least following at least one cycle having a known cycle time,
   wherein a local time is recalculated following each individual cycle, by adding a known cycle time to a most recently calculated time,
   wherein the absolute time information is transmitted by one of the subscribers of the communication system to the other subscribers to be synchronized, and
   wherein, for initialization, the item of absolute time information is transmitted to the subscribers to be synchronized as broadcast, by a global telegram.

13. The communication system according to claim 12, wherein the local time is recalculated in each case as a number of cycles having occurred up to this point.

14. The communication system according to claim 12, wherein the local times of the subscribers to be synchronized are recalculated after each arriving sync telegram.

15. The communication system according to claim 12, wherein the local times of the subscribers are recalculated a plurality of times per cycle.

16. A method for time synchronization of subscribers connected via a cyclically operating communication system, the method comprising:

transmitting an item of time information to the subscribers to be synchronized;
simultaneously transmitting an item of absolute time information for initialization to all of the subscribers to be synchronized; and
carrying out an individual synchronization by recalculating local times of the subscribers from the absolute time information and a cycle time in each case after at least one or a plurality of cycles having a known cycle time;
wherein the absolute time information is transmitted by one of the subscribers of the communication system to the other subscribers to be synchronized,
wherein in each recalculation of the local time, the item of absolute time information transmitted with the initialization is used as the basis, to which known cycle times of cycles having occurred up to this point are added, and
wherein, for initialization, the item of absolute time information is transmitted to the subscribers to be synchronized as broadcast, by a global telegram.

17. A subscriber of a cyclically operating communication system, comprising:
a computing unit configured for time synchronization so that, after receipt of an item of absolute time information for initialization, a local time of the subscriber is recalculated from the item of absolute time information and a cycle time, at least following at least one cycle having a known cycle time,
wherein the absolute time information is transmitted by one of the subscribers of the communication system to the other subscribers to be synchronized,
wherein in each recalculation of the local time, the item of absolute time information transmitted with the initialization is used as the basis, to which known cycle times of cycles having occurred up to this point are added, and
wherein, for initialization, the item of absolute time information is transmitted to the subscribers to be synchronized as broadcast, by a global telegram.

18. A cyclically operating communication system, comprising:
a computing unit; and
a subscriber, the subscriber including the computing unit;
wherein the computing unit is configured for time synchronization so that, after receipt of an item of absolute time information for initialization, a local time of the subscriber is recalculated from the item of absolute time information and a cycle time, at least following at least one cycle having a known cycle time,
wherein the absolute time information is transmitted by one of the subscribers of the communication system to the other subscribers to be synchronized,
wherein in each recalculation of the local time, the item of absolute time information transmitted with the initialization is used as the basis, to which known cycle times of cycles having occurred up to this point are added, and
wherein, for initialization, the item of absolute time information is transmitted to the subscribers to be synchronized as broadcast, by a global telegram.

* * * * *